April 9, 1968

R. C. LATALL 3,376,990

DRIVE ASSEMBLY AND MAST MOUNTING MEANS
FOR AN INDUSTRIAL VEHICLE

Original Filed Dec. 28, 1964

INVENTOR
ROY C. LATALL
BY *Robert H Johnson*
ATTORNEY

April 9, 1968

R. C. LATALL 3,376,990

DRIVE ASSEMBLY AND MAST MOUNTING MEANS
FOR AN INDUSTRIAL VEHICLE

Original Filed Dec. 28, 1964

INVENTOR
ROY C. LATALL

BY Robert H. Johnson

ATTORNEY

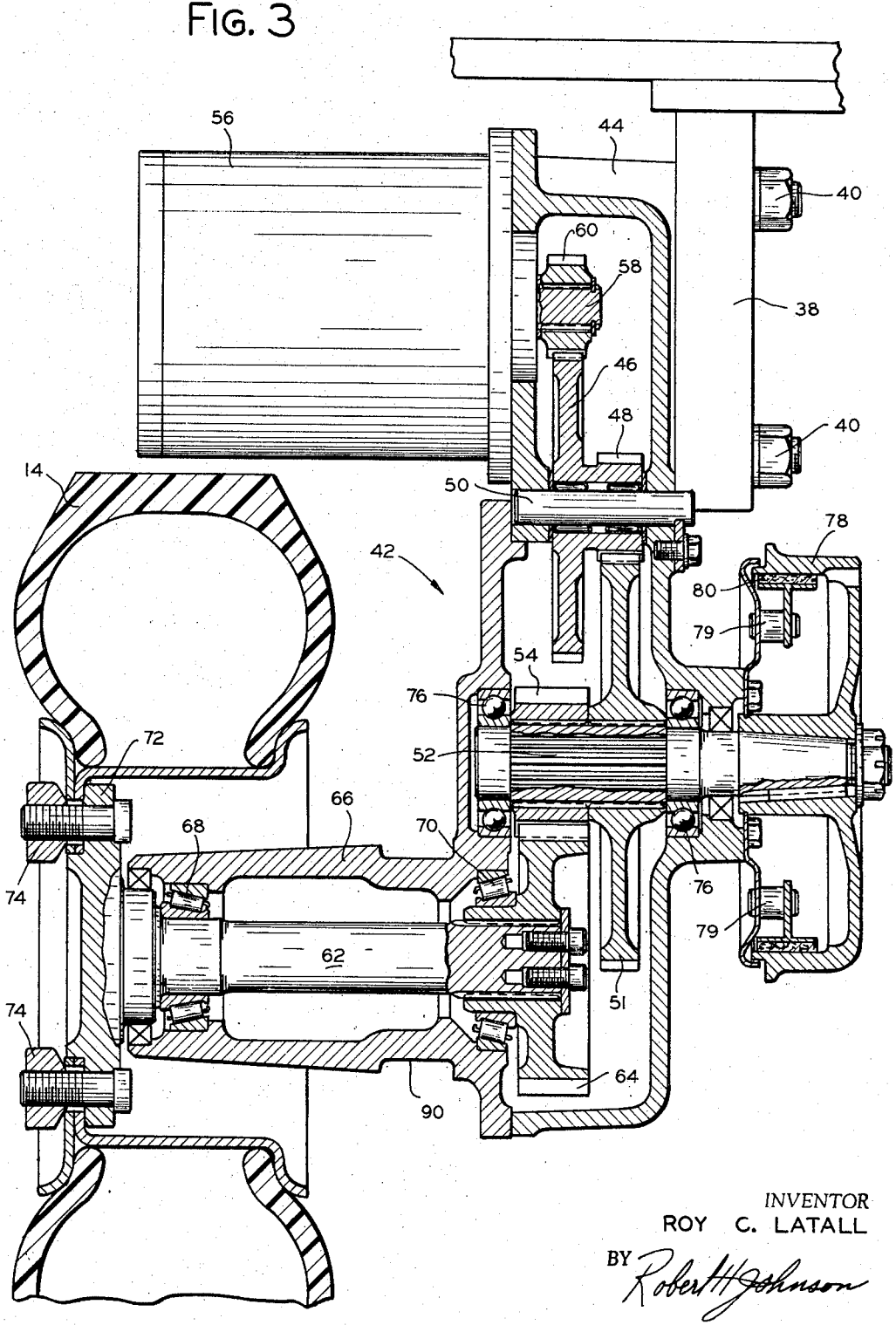

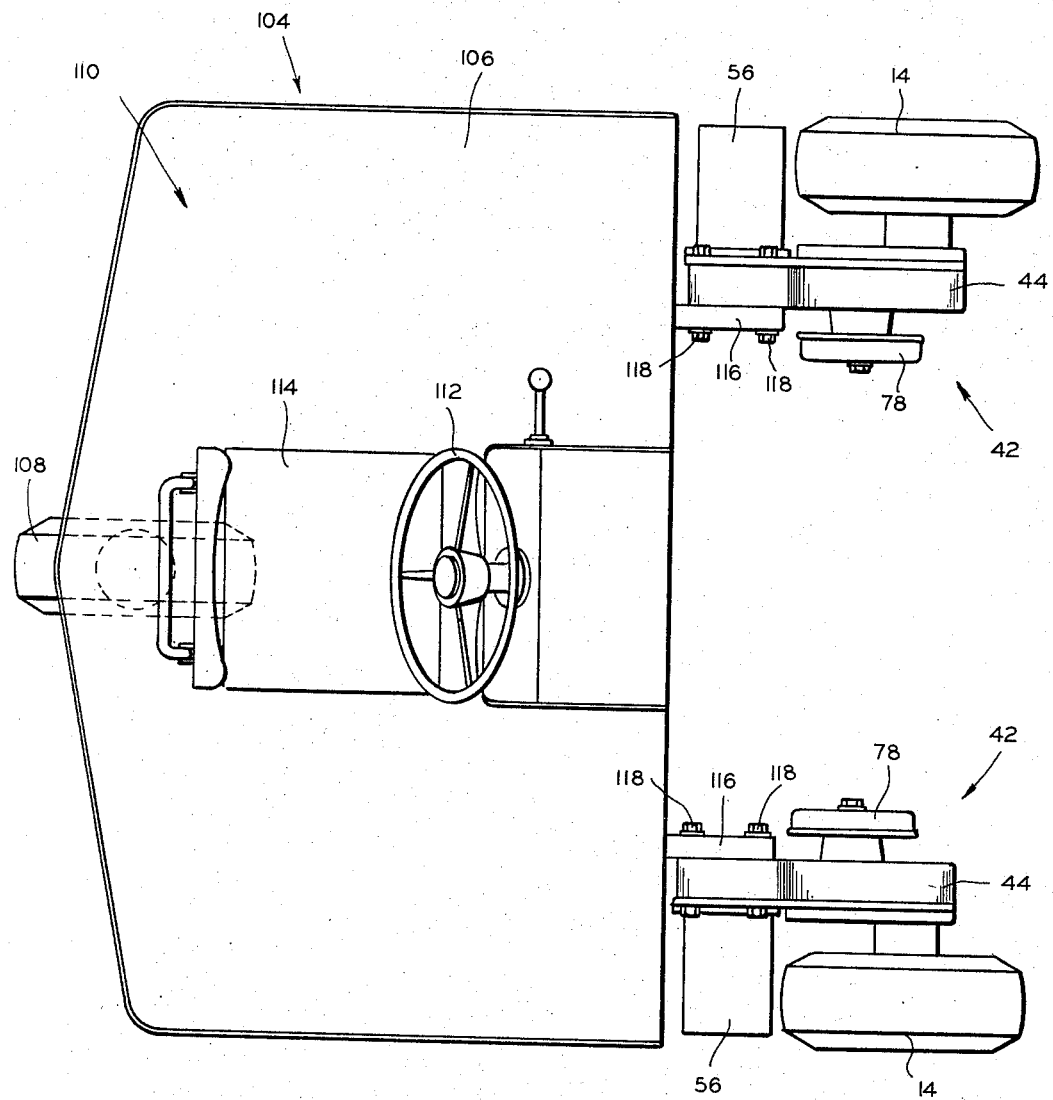

United States Patent Office 3,376,990
Patented Apr. 9, 1968

3,376,990
DRIVE ASSEMBLY AND MAST MOUNTING MEANS FOR AN INDUSTRIAL VEHICLE
Roy Charles Latall, Battle Creek, Mich., assignor to Clark Equipment Company, a corporation of Michigan
Continuation of application Ser. No. 421,207, Dec. 28, 1964. This application July 26, 1967, Ser. No. 656,297
2 Claims. (Cl. 214—671)

This application is a continuation of United States application 421,207 filed Dec. 28, 1964, now abandoned.

This invention relates to vehicles, and more specifically to a drive train assembly and the mounting thereof in certain types of vehicles, such as lift trucks.

One of the principal objects of my invention is to provide a mounting for a drive train assembly which eliminates alignment problems encountered heretofore in mounting such assemblies on the vehicle frame.

Another object of my invention is to provide an industrial truck having drive train assemblies which are easily mounted on and demounted from the truck body.

A further object of my invention is to provide a lift truck with a pair of laterally spaced apart drive train assemblies cantilevered from the truck body and a lift upright which forms the sole cross brace between the assemblies.

Still another object of my invention is to provide a vehicle which is generally U-shaped in plan view, the legs of the U being formed by a pair of laterally spaced apart drive train assemblies cantilevered from the vehicle body.

In carrying out my invention in a preferred embodiment I provide a vehicle body supported adjacent one end thereof by a dirigible wheel and supported adjacent the other end thereof by a pair of drive wheels connected to different ones of a pair of drive train assemblies which are connected to the body in cantilever fashion.

The above and other objects, features and advantages of my invention will be more readily understood from the following detailed description when taken in conjunction with the accompanying drawings wherein:

FIGURE 3 is a sectional view of one of the drive train assemblies taken along line 3—3 of FIG. 1; and FIGURE 4 shows a modification of my invention.

Figure 1:
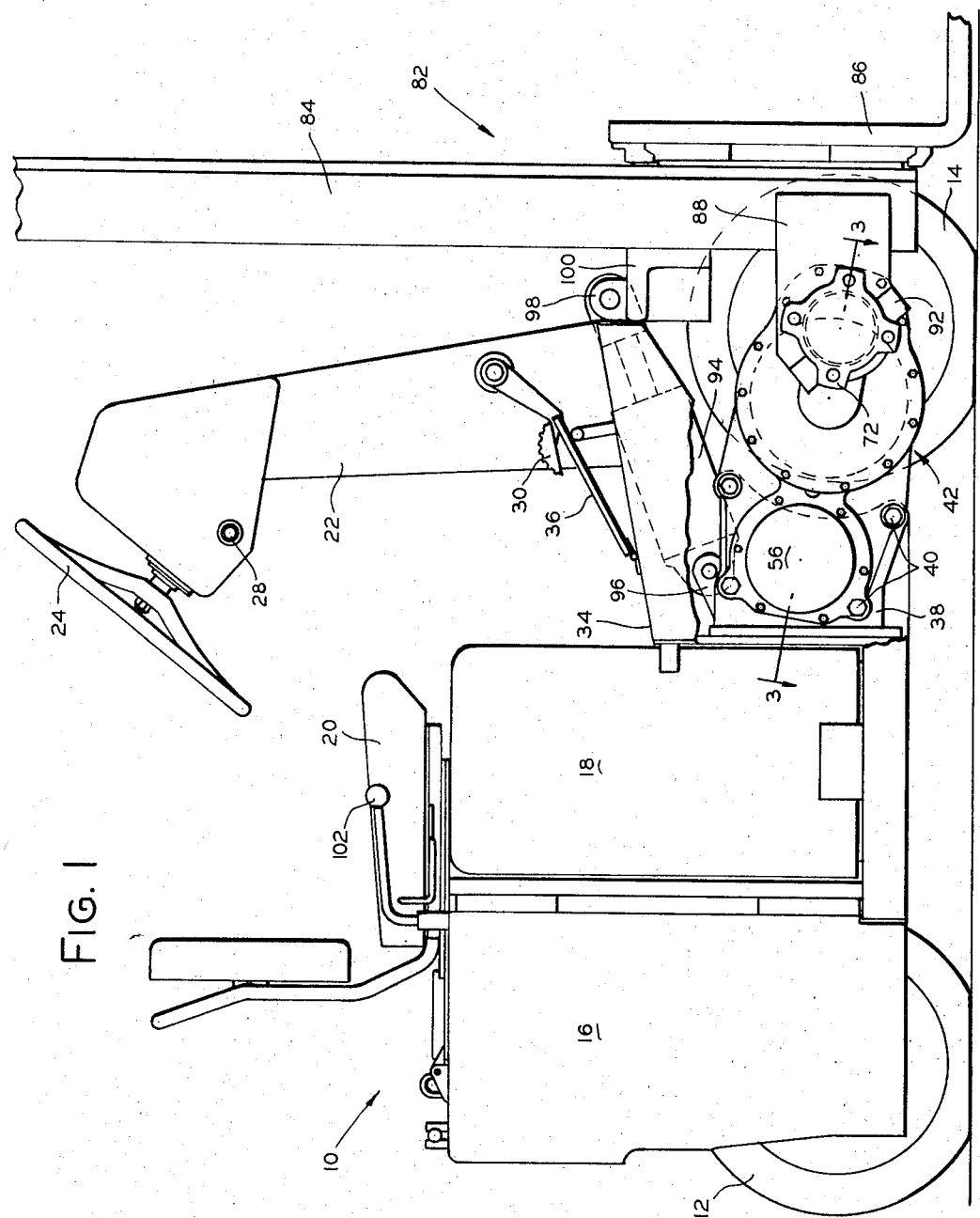
FIGURE 1 is a side elevation of a fork lift truck embodying my invention which shows in a cut-away portion one of the drive train assemblies.
Figure 2:
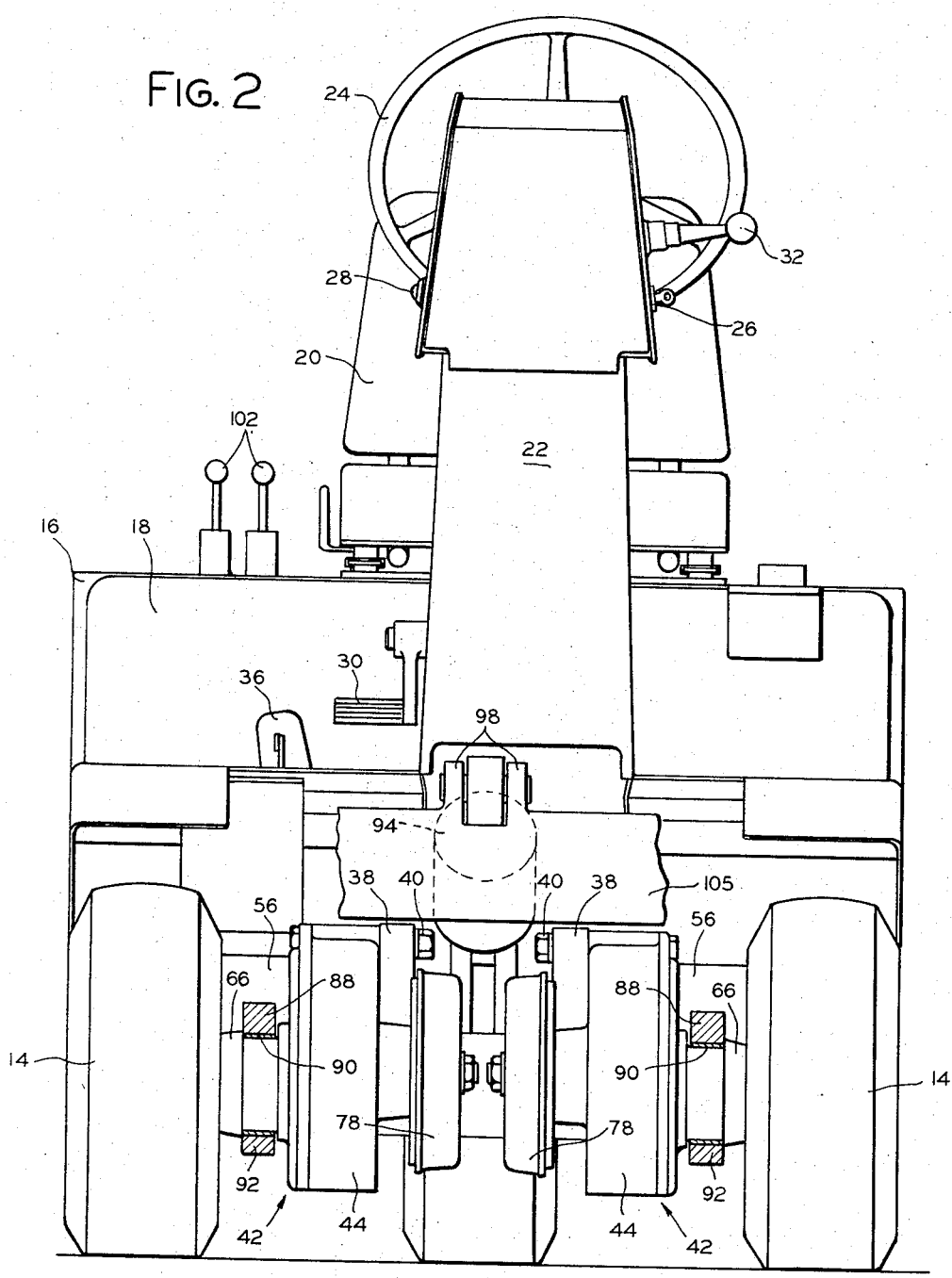
FIGURE 2 is an enlarged front elevation of the lift truck shown in FIG. 1 with the lift upright removed.

Referring to FIGS. 1 and 2, the reference numeral 10 denotes generally a fork lift truck, which is one representative type of vehicle with which my invention may be used, supported by a single rear dirigible wheel 12 and a pair of front drive wheels 14, the right front drive wheel and a portion of the truck body being omitted from FIG. 1 for the purpose of clarity. Truck 10 includes an elongated main body 16 which is provided with a space for an electric battery 18. Carried by body 16 and located above battery 18 is an operator's seat 20. Mounted on a floor portion 34 of body 16 and extending upwardly therefrom directly in front of seat 20 is a pedestal 22 which carries a steering control wheel 24 operatively connected to dirigible wheel 12 by suitable linkage, a key type on-off switch 26, a horn button 28, a brake pedal 30, and a forward-reverse direction control lever 32, all conveniently located for manipulation by an operator seated upon seat 20. Mounted on floor portion 34 to the right of pedestal 22 and brake pedal 30 is an accelerator pedal 36 through which the speed of the truck traction motors is controlled.

Extending longitudinally forwardly and vertically from the front end of body 16 is a pair of laterally spaced apart mounting plates 38. Rigidly fixed to each one of these plates by means of four nut and bolt assemblies 40 is a drive train assembly 42. As will be noted from reference to FIG. 1 each drive train assembly 42 is connected to body 16 only at one of the mounting plates 38. In other words, assemblies 42 are cantilevered from body 16.

Referring now also to FIG. 3, one of the drive assemblies 42 will be described in detail. Each assembly 42 includes a longitudinally extending rigid load-bearing housing 44 which is fixedly connected to the adjacent mounting plate 38 by nut and bolt assemblies 40. Located within housing 44 is a gear train including a pair of integral gears 46 and 48 rotatably mounted on a shaft 50, a gear 51 which meshes with a gear 48 and is splined to a rotatable brake shaft 52 and a gear 54 which also is splined to brake shaft 52.

The gear train is driven by means of electric motor 56 which is mounted on housing 44 and extends transversely outwardly therefrom, electric motor 56 having a shaft 58 to which a gear 60 is connected which meshes with gear 46 of the drive train. The above train of gears drives an axle shaft 62 through a gear 64 which is splined to the inner end of shaft 62 and which meshes with gear 54. Axle shaft 62 is rotatably mounted in transversely outwardly extending portion 66 of housing 44 by means of a pair of tapered roller bearings 68 and 70. The outer end of axle shaft 62 is provided with a flange 72 to which wheel 14 is attached by means of a plurality of lug bolts 74.

Brake shaft 52 is rotatably journaled in housing 44 by means of a pair of ball bearings 76 and extends at one end thereof transversely outwardly of housing 44 as shown. Carried on the outer end of brake shaft 52 and fixed thereto for rotation therewith is a brake drum 78. Disposed within brake drum 78 and fixed to an adjacent portion of housing 44 by means of a support 79 is a pair of brake shoes 80 which upon depression of brake pedal 30 are expanded by means of a hydraulic actuator, not shown, into frictional engagement with the inner periphery of the brake drum, thereby providing a brake for each of wheels 14. It will be noted that the location of the brake is such that a mechanical advantage is provided through gears 54 and 64 so that a relatively small brake may be used to obtain the required braking effect at wheel 14.

At this point it will be noted that electric motor 56 and axle shaft 62 extend in the same direction from assembly 42 and that brake 78, 80 extends in the opposite direction. Further, assemblies 42 are disposed so that brakes 78, 80 extend toward each other.

Carried forwardly of truck 10 is a conventional lift upright 82 (FIG. 1) which includes a pair of laterally spaced apart non-elevatable outer mast members 84, only one of which is shown, and vertically actuatable load lifting and engaging mechanism 86. Lift upright 82 is connected to drive train assemblies 42 by means of a pair of generally longitudinally extending brackets 88 which preferably are welded to outer mast members 84 and are pivotally connected to the outwardly extending portions 66 of housings 44 at a bearing portion 90 by semi-circular clamp members 92.

Lift upright 82 is arranged to be tilted forwardly and rearwardly about bearing portions 90 by a double-acting fluid motor 94 which is connected at one end to a bifurcated bracket 96 and at the other end to another bifurcated bracket 98. Bracket 98 is connected to a cross-brace 100 which is welded to outer mast members 84. Fluid motor 94 is controlled by means of one of the control handles 102 located alongside of seat 20. The other of control handles 102 controls the elevation and lowering of the load engaging and lifting mechanism 86.

From the foregoing, it will be seen that I have provided a lift truck having a body 16 which is supported by a single rear dirigible wheel 12 and by a pair of front drive wheels 14 that are carried by a pair of drive train assemblies 42 which are cantilevered from the front end of body 16. Further, the drive train assemblies 42 also carry lift upright 82.

Referring now to FIG. 4, there is shown a modification of my invention. In this modification the lift upright is omitted and the drive train assemblies 42 are moved laterally away from each other in order to provide an open bay or pocket between the two drive train assemblies.

More specifically, there is provided a vehicle 104 having a main body 106 which is supported adjacent the rear end thereof by a single dirigible wheel 108 and upon which an operator's station 110 is located. Operator's station 110 includes a steering control wheel 112 and a seat 114.

Extending longitudinally forwardly and vertically from the front end of body 106 is a pair of laterally spaced apart mounting plates 116. Rigidly fixed to each one of these plates by means of four nut and bolt assemblies 118 is a drive train assembly 42. As was true with the first-mentioned embodiment of my invention, each drive train assembly 42 is connected to body 106 only at the respective mounting plate 116. As a result, assemblies 42 are cantilevered from body 106 and are disposed so as to extend longitudinally forwardly therefrom.

Each assembly 42 used in vehicle 104 is identical with assemblies 42 which are described hereinabove, except that bearing portions 90 are omitted from the assemblies 42 shown in FIG. 4 as they do not serve any function except in conjunction with a lift upright. Consequently, like reference numerals are applied to FIG. 4 to indicate like parts and reference is made here to the earlier description hereinabove for further description of assemblies 42.

The vehicle shown in FIG. 4 has a number of applications. For example, a rotary broom may be disposed in the bay between the two drive train assemblies 42 in order to provide a self-propelled sweeper vehicle. Further, vehicle 104 can be adapted to transport a tote box or similar container in the bay formed by assemblies 42.

Although I have described and illustrated a preferred embodiment of my invention, it will be understood by those skilled in the art that modifications may be made in the structure, form and relative arrangement of parts without departing from the scope and spirit of my invention. For example, the gear train contained within the drive train assemblies may be replaced by a suitable chain and sprocket arrangement for transmitting power from the electric motor to the axle shaft, the electric motors may be replaced by fluid motors in a hydrostatic type drive which may be powered either by an electric motor or an internal combustion engine, and the two separate drive train assemblies may be replaced by a single drive train assembly which is cantilevered from the truck body and which carries a pair of drive wheels. Accordingly, it should be understood that I intend to cover by the appended claims all such modifications which fall within the scope of my invention.

I claim:

1. A vehicle comprising an elongated body, a pair of laterally spaced apart mounting members located at the front of the said body, a wheel connected to and partially supporting the said body, and a pair of drive train assemblies, each assembly including an elongated housing with a transversely extending arm, a wheel carried at the outer end of the said arm and a motor connected to the said housing so that the said motor, arm and housing define generally a horizontal U-shape, the said assemblies being spaced laterally apart and detachably fixed only to separate ones of the said mounting members so that the said assemblies extend substantially longitudinally of the said body forwardly and outwardly from the said mounting members and the said arms and motors extend outwardly away from each other, a lift mechanism pivotally attached to said arms and serving as a lateral brace between said assemblies, said monting members, assemblies, motor and wheels being disposed inwardly of the lateral exterior sides of said body, and said motors being located between the body and arms.

2. A vehicle as set forth in claim 1 wherein each assembly includes means disposed in the respective housing for drivingly connecting the respective motor and wheel.

References Cited

UNITED STATES PATENTS

| | | | |
|---|---|---|---|
| 2,325,396 | 7/1943 | Hasting | 180—13 |
| 2,592,091 | 4/1952 | Weaver | 180—13 |
| 2,598,865 | 6/1952 | Turner | 214—701 |
| 2,846,018 | 8/1958 | Puckett | 180—6.2 |
| 3,003,586 | 10/1961 | Loef et al. | 187—9 |
| 3,098,574 | 7/1963 | De Marco | 214—674 |
| 3,211,248 | 10/1965 | Quayle | 180—13 |

FOREIGN PATENTS

| | | |
|---|---|---|
| 1,116,542 | 11/1961 | Germany. |
| 463,847 | 8/1951 | Italy. |

GERALD M. FORLENZA, *Primary Examiner.*

R. B. JOHNSON, *Assistant Examiner.*